United States Patent
Ren et al.

(10) Patent No.: US 11,014,835 B2
(45) Date of Patent: May 25, 2021

(54) METHOD OF MEASURING CONCENTRATION OF DISSOLVED ORGANIC NITROGEN IN SEWAGE

(71) Applicant: Nanjing University, Nanjing (CN)

(72) Inventors: Hongqiang Ren, Nanjing (CN); Haidong Hu, Nanjing (CN); Jinju Geng, Nanjing (CN); Lili Ding, Nanjing (CN); Hui Huang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 16/902,213

(22) Filed: Jun. 15, 2020

(65) Prior Publication Data

US 2020/0308027 A1    Oct. 1, 2020

Related U.S. Application Data

(63) Continuation-in-part of application No. 16/274,213, filed on Feb. 12, 2019, now abandoned, which is a (Continued)

(30) Foreign Application Priority Data

Jan. 20, 2017    (CN) .......................... 201710048270.3

(51) Int. Cl.
*C02F 1/44*    (2006.01)
*C02F 3/30*    (2006.01)

(52) U.S. Cl.
CPC .............. *C02F 1/447* (2013.01); *C02F 3/305* (2013.01); *C02F 2209/003* (2013.01); *C02F 2209/16* (2013.01)

(58) Field of Classification Search
CPC ...... G01N 21/77; G01N 21/33; B01D 61/243; B01D 61/32; B01D 71/16; B01D 61/28
See application file for complete search history.

(56) References Cited

PUBLICATIONS

Lee et al (Dissolved Organic Nitrogen Measurement Using Dialysis Pretreatment, Environ. Sci. Technol., 2005, 6 Pages) (Year: 2005).*
(Continued)

*Primary Examiner* — Benjamin R Whatley
*Assistant Examiner* — Jean Caraballo-Leon
(74) *Attorney, Agent, or Firm* — Matthias Scholl P.C.; Matthias Scholl

(57) ABSTRACT

A method of measuring concentration of dissolved organic nitrogen in sewage. The method includes: filtering a sewage sample using a filter membrane; measuring the concentrations of total dissolved nitrogen (TDN), ammonia nitrogen ($NH_4^+$), and nitric nitrogen ($NO_3^-$) in the sewage sample, respectively designated as $C_{TDN(I)}$, $C_{NH4^+(I)}$ and $C_{NO3^-(I)}$; calculating the ratios of $(C_{NH4^+(I)} + C_{NO3^-(I)})/C_{TDN(I)}$ and $C_{NO3^-(I)}/C_{NH4^+(I)}$, and according to the ratios, calculating the concentration of dissolved organic nitrogen (DON) in the sewage sample.

3 Claims, 6 Drawing Sheets

Related U.S. Application Data continuation-in-part of application No. PCT/CN2017/095851, filed on Aug. 3, 2017.

(56) References Cited

PUBLICATIONS

Clescerl et al (Standard Methods for the Examination of Water and Wastewater, 1999, 733 Pages) (Year: 1999).*

Sin et al (Modelling nitrite in wastewater treatment systems: a discussion of different modelling concepts, Water Science & Technology, 2008, 18 Pages) (Year: 2008).*

\* cited by examiner

METHOD OF MEASURING CONCENTRATION OF DISSOLVED ORGANIC NITROGEN IN SEWAGE

CROSS-REFERENCE TO RELATED APPLICATIONS

This application is a continuation-in-part of U.S. application Ser. No. 16/274,213, filed Feb. 12, 2019, now pending, which is a continuation-in-part of International Patent Application No. PCT/CN2017/095851 with an international filing date of Aug. 3, 2017, designating the United States, and further claims foreign priority benefits to Chinese Patent Application No. 201710048270.3 filed Jan. 20, 2017. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

This disclosure relates to a method of measuring concentration of dissolved organic nitrogen in sewage.

Total dissolved nitrogen (TDN) in sewage includes dissolved inorganic nitrogen (DIN) and dissolved organic nitrogen (DON).

Conventionally, to measure the concentration of DON, the concentrations of TDN and DIN (including ammonia nitrogen, nitrate nitrogen and nitrite nitrogen) are measured, respectively, and then the difference between them is calculated. The entire measurement processes are complex and inefficient, and the results are generally inaccurate.

SUMMARY

Disclosed is a method of measuring concentration of dissolved organic nitrogen in sewage.

The disclosure provides a method of measuring concentration of dissolved organic nitrogen in sewage, the method comprising:

(1) filtering a sewage sample using a filter membrane;

(2) measuring concentrations of total dissolved nitrogen (TDN), ammonia nitrogen ($NH_4^+$), and nitric nitrogen ($NO_3^-$) in the sewage sample, respectively designated as $C_{TDN(I)}$, $C_{NH_4^+(I)}$ and $C_{NO_3^-(I)}$;

(3) calculating ratios of $(C_{NH_4^+(I)}+C_{NO_3^-(I)})/C_{TDN(I)}$ and $C_{NO_3^-(I)}/C_{NH_4^+(I)}$, and according to the ratios, performing one of the following to measure concentrations of nitrogen-containing groups in the sewage sample;

(3.1) when $(C_{NH_4^+(I)}+C_{NO_3^-(I)})/C_{TDN(I)}<0.7$, measuring a concentration of nitrite nitrogen ($NO_2^-$) in the sewage sample, designated as $C_{NO_2^-(I)}$, and calculating a concentration of dissolved organic nitrogen (DON) in the sewage sample as follows: DON=$C_{TDN(I)}-C_{NH_4^+(I)}-C_{NO_3^-(I)}-C_{NO_2^-(I)}$;

(3.2) when $(C_{NH_4^+(I)}+C_{NO_3^-(I)})/C_{TDN(I)} \geq 0.7$ and $C_{NO_3^-(I)}/C_{NH_4^+(I)} \geq 1$, dialyzing the sewage sample in a suspended dialysis bag for between 22 and 26 hours, and measuring concentrations of total dissolved nitrogen (TDN), ammonia nitrogen ($NH_4^+$), nitric nitrogen ($NO_3^-$) and nitrite nitrogen ($NO_2^-$) in the sewage sample, respectively designated as $C_{TDN(II)}$, $C_{NH_4^+(II)}$, $C_{NO_3^-(II)}$, and $C_{NO_2^-(II)}$, and calculating a concentration of dissolved organic nitrogen (DON) in the sewage sample as follows: DON=$C_{TDN(II)}-C_{NH_4^+(II)}-C_{NO_3^-(II)}-C_{NO_2^-(II)}$; and (3.3) when $(C_{NH_4^+(I)}+C_{NO_3^-(I)})/C_{TDN(I)} \geq 0.7$ and $C_{NO_3^-(I)}/C_{NH_4^+(I)}<1$, dialyzing the sewage sample in a suspended dialysis bag for between 34 and 38 hours, and measuring concentrations of total dissolved nitrogen (TDN), ammonia nitrogen ($NH_4^+$), nitric nitrogen ($NO_3^-$) and nitrite nitrogen ($NO_2^-$) in the sewage sample, respectively designated as $C_{TDN(III)}$, $C_{NH_4^+(III)}$, $C_{NO_3^-(III)}$, and $C_{NO_2^-(III)}$, and calculating a concentration of dissolved organic nitrogen (DON) in the sewage sample as follows: DON=$C_{TDN(III)}-C_{NH_4^+(III)}-C_{NO_3^-(III)}-C_{NO_2^-(III)}$.

The filter membrane can have a pore size of 0.45 μm.

The suspended dialysis bag in (3.2) and (3.3) can be a cellulose ester membrane, hydrophilic, and can have a molecular weight cut-off (MWCO) of 100-500 Da; and the hydraulic retention time of the dialysate in the sewage sample can be 4 h.

The concentrations of the total dissolved nitrogen (TDN), ammonia nitrogen ($NH_4^+$), nitric nitrogen ($NO_3^-$) and nitrite nitrogen ($NO_2^-$) can be measured using potassium persulfate oxidation-ion chromatography, salicylic acid-hypochlorite spectrophotometry, ion chromatography and N-(1-naphthyl)-ethylenediamine spectrophotometry, respectively.

Advantages of the method of measuring concentration of dissolved organic nitrogen in sewage in the disclosure are summarized as below.

1. The method is efficient, and energy-saving;
2. The measurement method is accurate; and
3. The method is easy to operate, and is cost-effective.

DETAILED DESCRIPTION

Measurement conditions affecting the method of measuring the DON concentration in sewage are described below in details with reference to the drawings.

Figure 3:
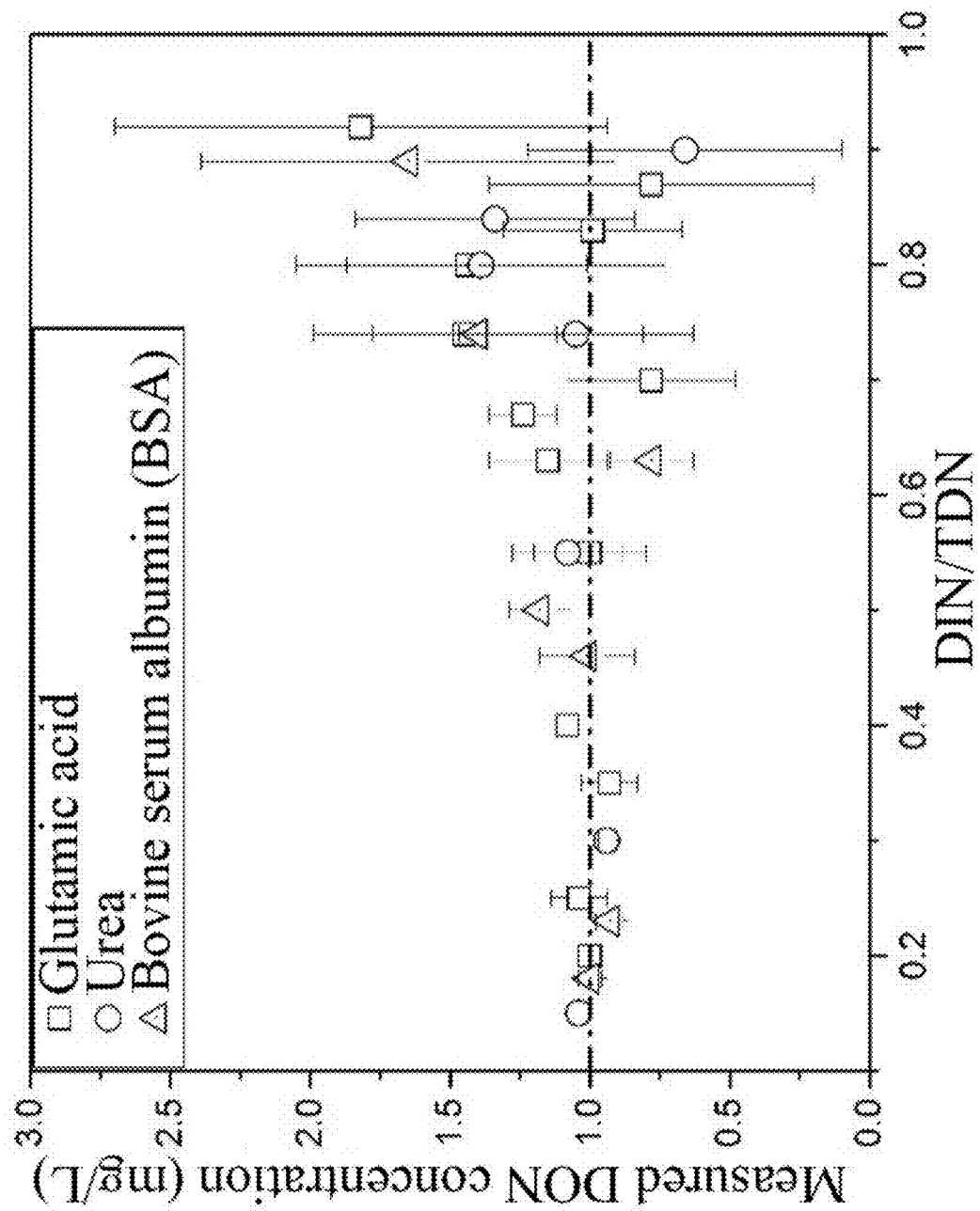
FIG. 3 is a diagram of measured DON concentrations of urea solution, glutamic acid solution, and bovine serum albumin (BSA) solution having a solute concentration of 1 mg/L and varying DIN/TDN ratios.
Figure 4:
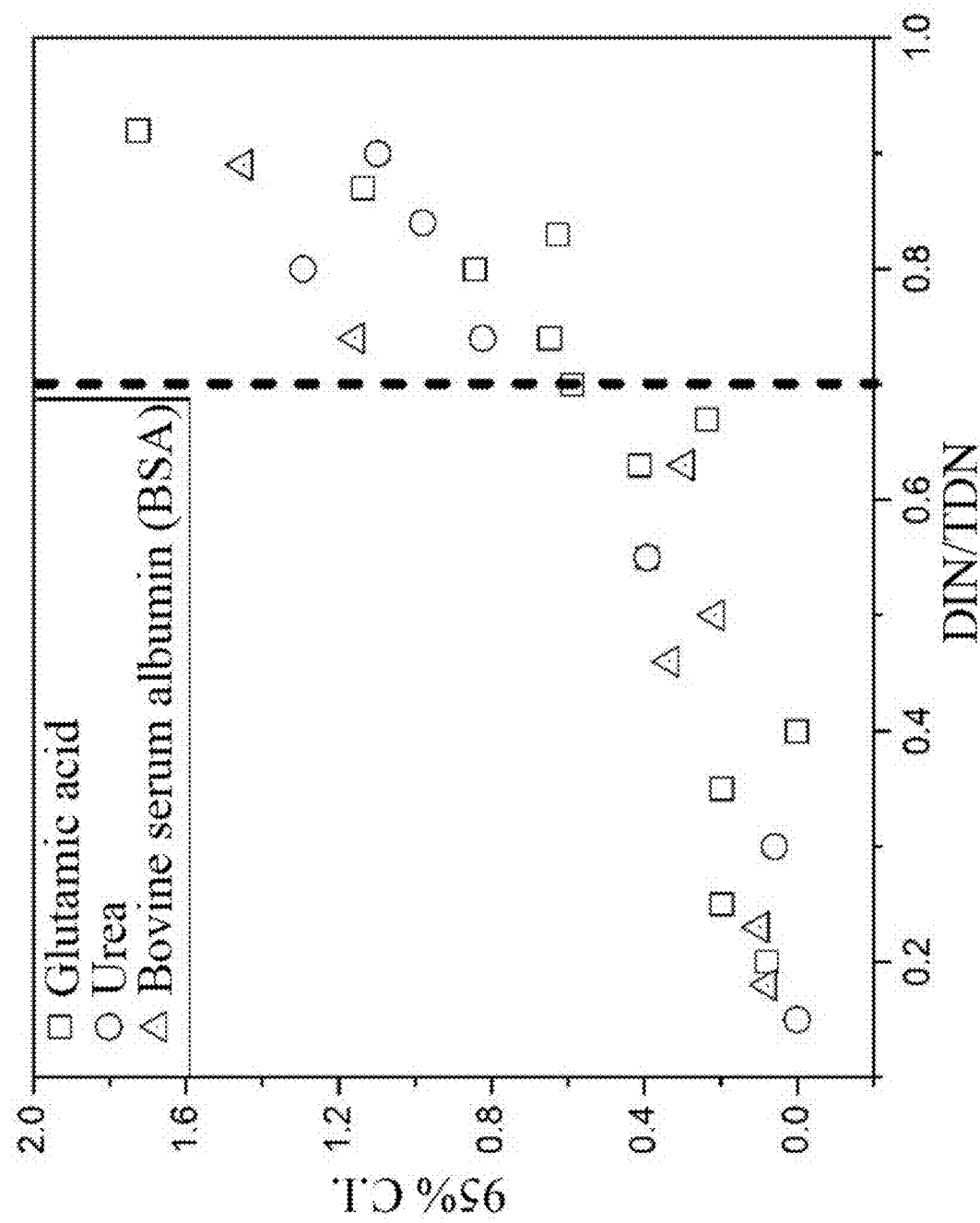
FIG. 4 is a diagram of 95% confidence intervals of the measured DON concentrations of FIG. 3.

1. Influence of DIN/TDN Ratio on the Measurement of DON Concentration:

Three nitrogen-containing organic compounds having different molecular weights, including urea, glutamic acid, and bovine serum albumin (BSA), were dissolved in water at a concentration of 1 mg/L, respectively. Concentrations of the nitrogen-containing organic compounds in the sample solutions were measured without dialysis. As shown in FIG. 3, when DIN/TDN≤0.7, the measured DON concentrations of the three nitrogen-containing organic compounds are close to their actual concentration of 1 mg/L, and the 95% confidence intervals (95% C.I.) of the measured DON concentrations are less than 0.4. When DIN/TDN≥0.7, the measured DON concentrations of the nitrogen-containing organic compounds obviously deviate from the actual concentration of 1 mg/L. For example, when DIN/TDN=0.92, the measured concentration of glutamic acid is 1.82±0.88 mg/L, while 95% C.I.=1.72. FIG. 4 shows that 95% C.I. increases with the increase of DIN/TDN ratio.

The measurement of DON concentration is calculated by subtracting DIN (sum of the concentrations of $NH_4^+$, $NO_3^-$, and $NO_2^-$) from TDN. Because each species of inorganic nitrogen would produce a concentration error during the measurement, the subtraction of DIN that includes concentrations of multiple species from TDN would amplify error in the DON measurement. Therefore, when DIN/TDN≥0.7 in the sewage, the accuracy of DON measurement is low (95% C.I.>0.4) and, therefore, dialysis pretreatment is required to improve measurement accuracy.

Figure 5:
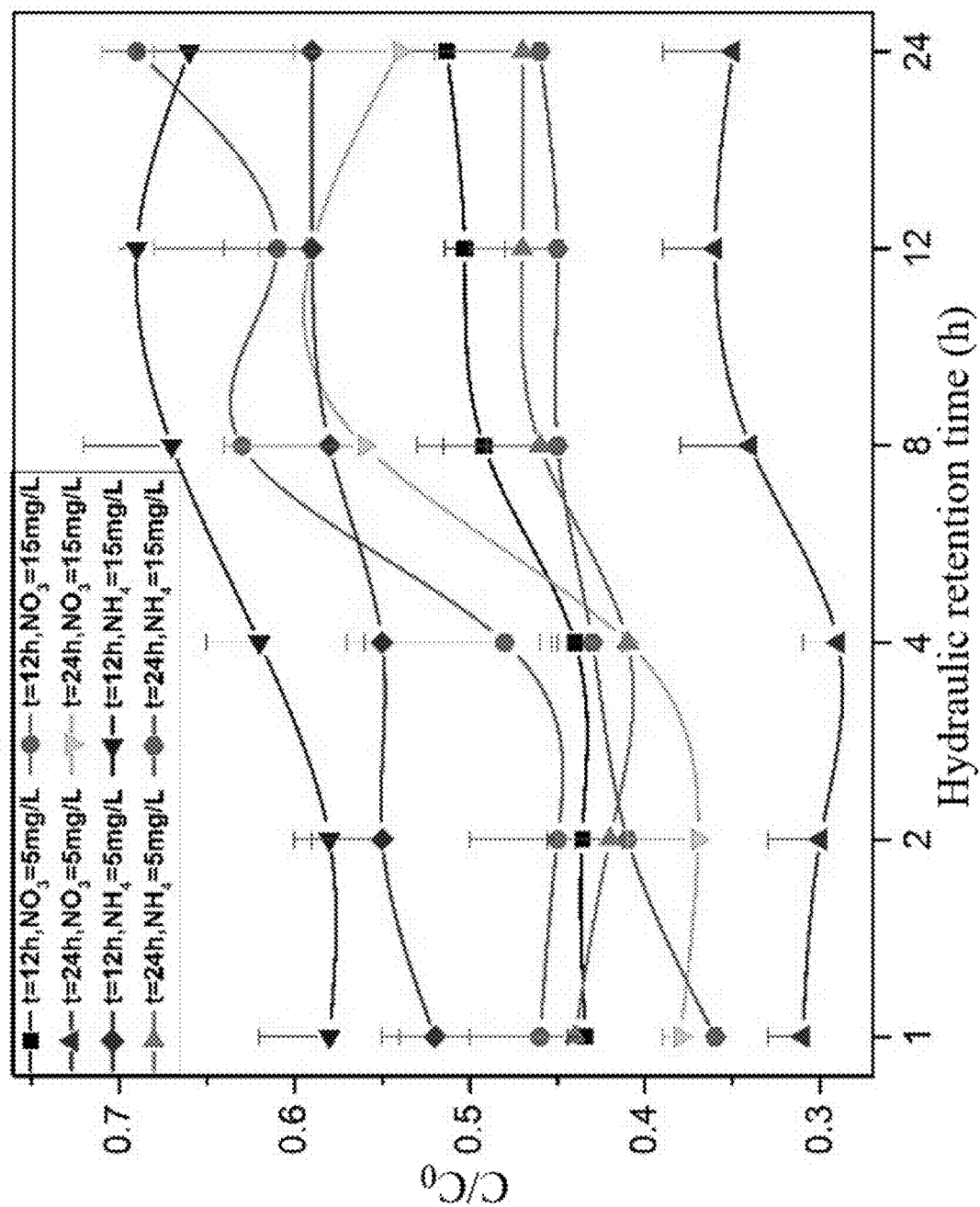
FIG. 5 is a diagram of removal rates of $NO_3^-$ by dialyzing NW/$NO_3^-$ solutions using dialysates having different hydraulic retention times.

2. Hydraulic Retention Time of Dialysates:

The inorganic nitrogen species in sewage are mainly $NH_4^+$ and $NO_3^-$, and additionally $NO_2^-$ at a low concentration. To determine the influence of the dialysates' hydraulic retention time on DON measurement, solutions respectively containing 5 mg/L of $NH_4^+$ and 15 mg/L of $NO_3^-$ were prepared as sample solutions. Dialysis of the sample solutions was conducted by using dialysates having a hydraulic retention time of 1, 2, 4, 8, 12, and 24 h, respectively, for 12 or 24 h. The concentrations of remaining $NH^{4+}$ and $NO_3^-$ in the dialysis bags were measured after dialysis. The results are shown in FIG. 5. When the hydraulic retention time of the dialysate increases from 1 h to 4 h, the concentrations of remaining $NH_4^+$ and $NO_3^-$ in the dialysis bag do not increase significantly. When the hydraulic retention time of dialysate is greater than 4 h, as the dialysate hydraulic retention time increases, the concentrations of remaining $NH_4^+$ and $NO_3^-$ in dialysis bags change obviously. For example, when the original concentration of $NO_3^-$ is 15 mg/L and the hydraulic retention time of the dialysate increases from 4 h to 8 h, the ratio of the concentration of the remaining $NO_3^-$ to the original concentration of $NO^{3-}$ ($C/C_0$) increases from 0.48 to 0.63 after dialysis for 12 h, and increases from 0.29 to 0.34 after dialysis for 24 h. Thus, shorter hydraulic retention time of the dialysate results in greater removal rate of $NH_4^+$ and $NO_3^-$. When the hydraulic retention time of the dialysate is less than 4 h, the removal rate of $NH_4^+$ and $NO_3^-$ does not increase with the decrease of the dialysate's hydraulic retention time.

3. Dialysis Time:

Urea, glutamic acid, BSA, and a lyophilized sewage sample comprising organic nitrogen were dissolved in solutions having a variety of $NO_3^-/NH_4^+$ ratios. The concentrations of urea, glutamic acid, BSA, and lyophilized sewage sample in the sample solutions were 1 mg/L. The hydraulic retention time of the dialysate was 4 h. The DON concentrations of the prepared solutions were measured after dialysis for different time. The results are shown in FIG. 6.

The $NO_3^-/NH_4^+$ ratio of the sample significantly affects the measured DON concentration. As shown in FIG. 6, when the dialysis time (t) is 24 h and the $NO_3^-/NH_4^+$ ratio≥1, the average absolute deviation of the measured concentration of DON with respect to the actual concentration (1 mg/L) of the solutions of urea, glutamic acid, BSA, and the lyophilized sewage sample are smaller than those when $NO_3^-/NH^{4+}<1$. In particular, when $NO_3^-/NH_4^+<1$ and DIN/TDN=0.92, the average absolute deviation of the measured concentration of DON with respect to the actual concentration of BSA is as high as 19.0%. The isoelectric point of the dialysis membrane used in the dialysis is pH=2.2. When the pH is greater than 2.2, the membrane is negatively charged and attracts the positively charged $NH_4^+$ so as to prevent $NH_4^+$ from passing through the dialysis membrane, which leads to a removal rate of $NH_4^+$ lower than that of $NO_3^-$ and a high average absolute deviation of the measured concentration of DON with respect to the actual concentration of DON when $NO_3^-/NH^{4+}<1$.

Figure 6:
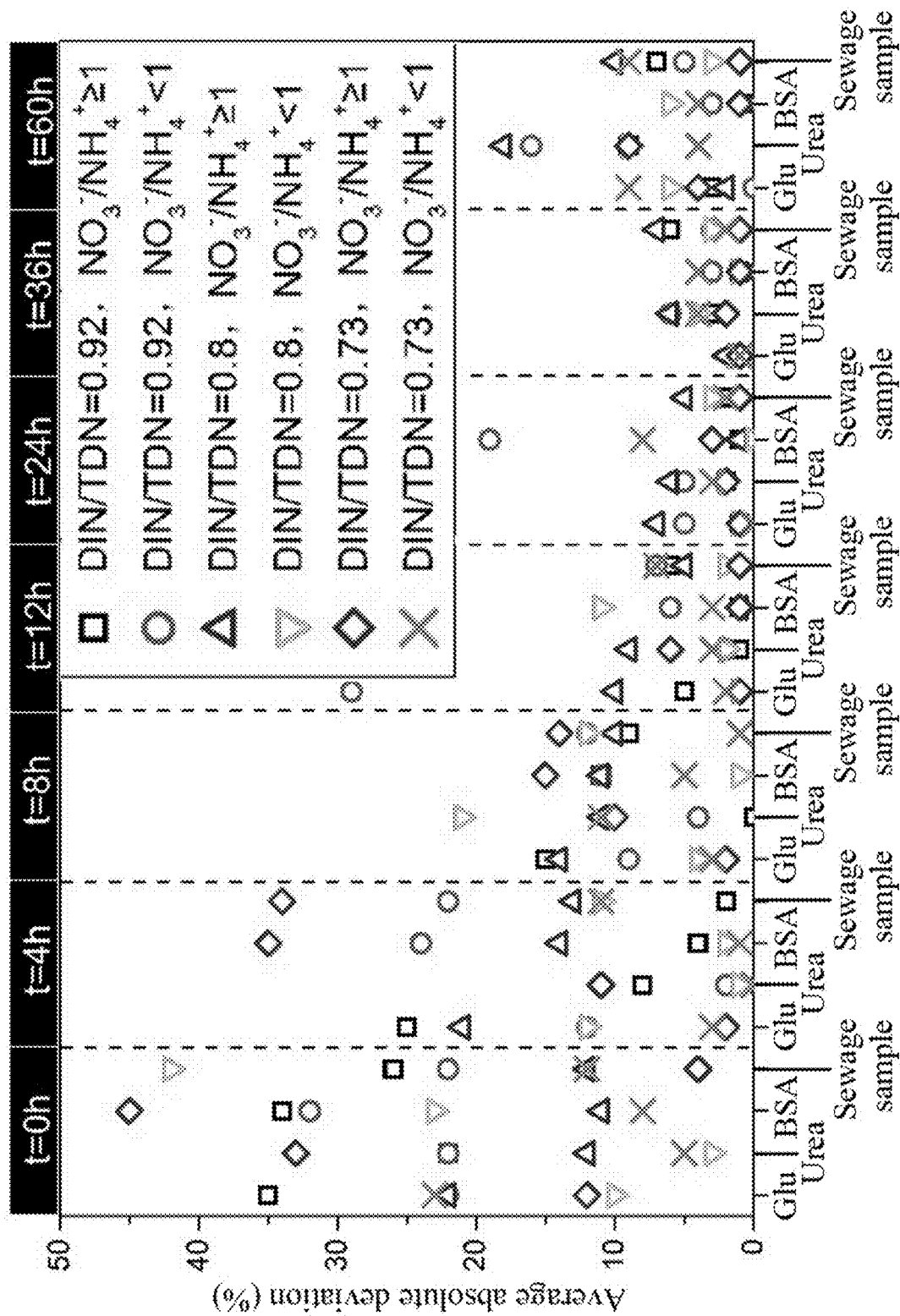
FIG. 6 is a diagram of the high average absolute deviation of the concentration of DON with respect to the actual concentration of DON in urea solution, glutamic acid solution, and BSA solution measured after dialysis of different dialysis time.

As shown in FIG. 6, when $NO_3^-/NH_4^+≥1$, increase of the dialysis time from 24 h to 36 h or 60 h does not lead to significant change of the average absolute deviation of the measured concentration of DON with respect to the actual concentration of DON.

To further illustrate, examples detailing a method of measuring concentration of dissolved organic nitrogen in sewage are described below. It should be noted that the following examples are intended to describe and not to limit the description.

Example 1

1. 100 mL of municipal sewage (labeled as sample 1) was filtered using a filter membrane having a pore size of 0.45 μm.

2. The concentrations of the total dissolved nitrogen (TDN), $NH_4^+$ and $NO_3^-$ of the sewage were measured using potassium persulfate oxidation-ion chromatography, salicylic acid-hypochlorite spectrophotometry, and ion chromatography, respectively, and were recorded as $C_{TDN(I)}$, $C_{NH4^+(I)}$ and $C_{NO3^-(I)}$;

3. The results showed that $(C_{NH4^+(I)}+C_{NO3^-(I)})/C_{TDN(I)}=0.92>0.7$ and $C_{NO3^-(I)}/C_{NH4^+(I)}>1$. The sewage was dialyzed in a suspended dialysis bag for 24 hours. The suspended dialysis bag was a cellulose ester membrane, hydrophilic, and had a molecular weight cut-off (MWCO) of 100 Da; and the hydraulic retention time of the dialysate in the sewage sample was 4 h. Thereafter, the concentrations of the total dissolved nitrogen (TDN), ammonia nitrogen ($NH_4^+$), nitric nitrogen ($NO_3^-$) and nitrite nitrogen ($NO_2^-$) were measured using potassium persulfate oxidation-ion chromatography, salicylic acid-hypochlorite spectrophotometry, ion chromatography and N-(1-naphthyl)-ethylenediamine spectrophotometry, respectively, and recorded as $C_{TDN(II)}$, $C_{NH4^+(II)}$, $C_{NO3^-(II)}$, and $C_{NO2^-(II)}$, respectively.

Figure 1:
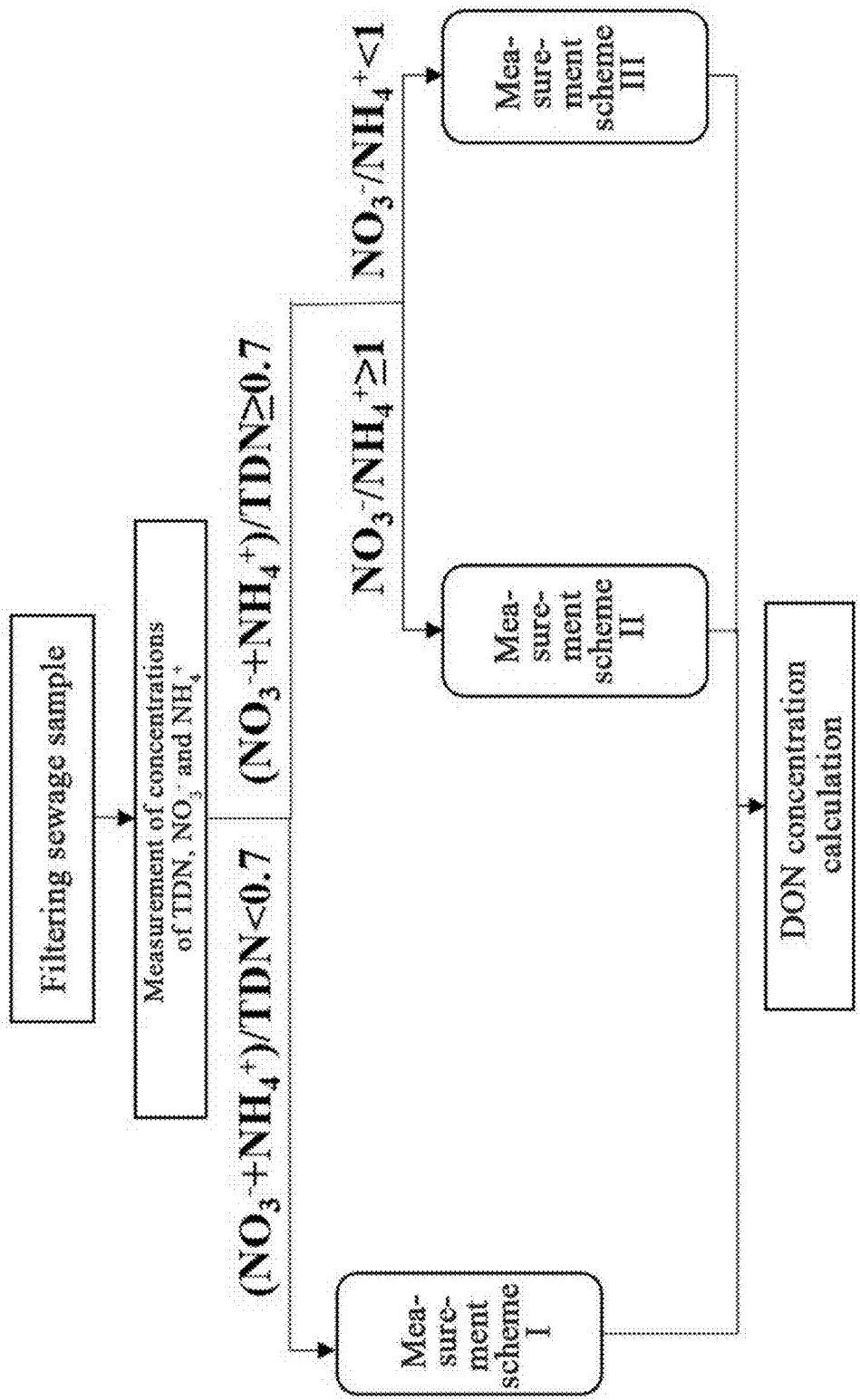
FIG. 1 is a flow chart of a method of measuring concentration of dissolved organic nitrogen in sewage as described in the disclosure.
Figure 2:
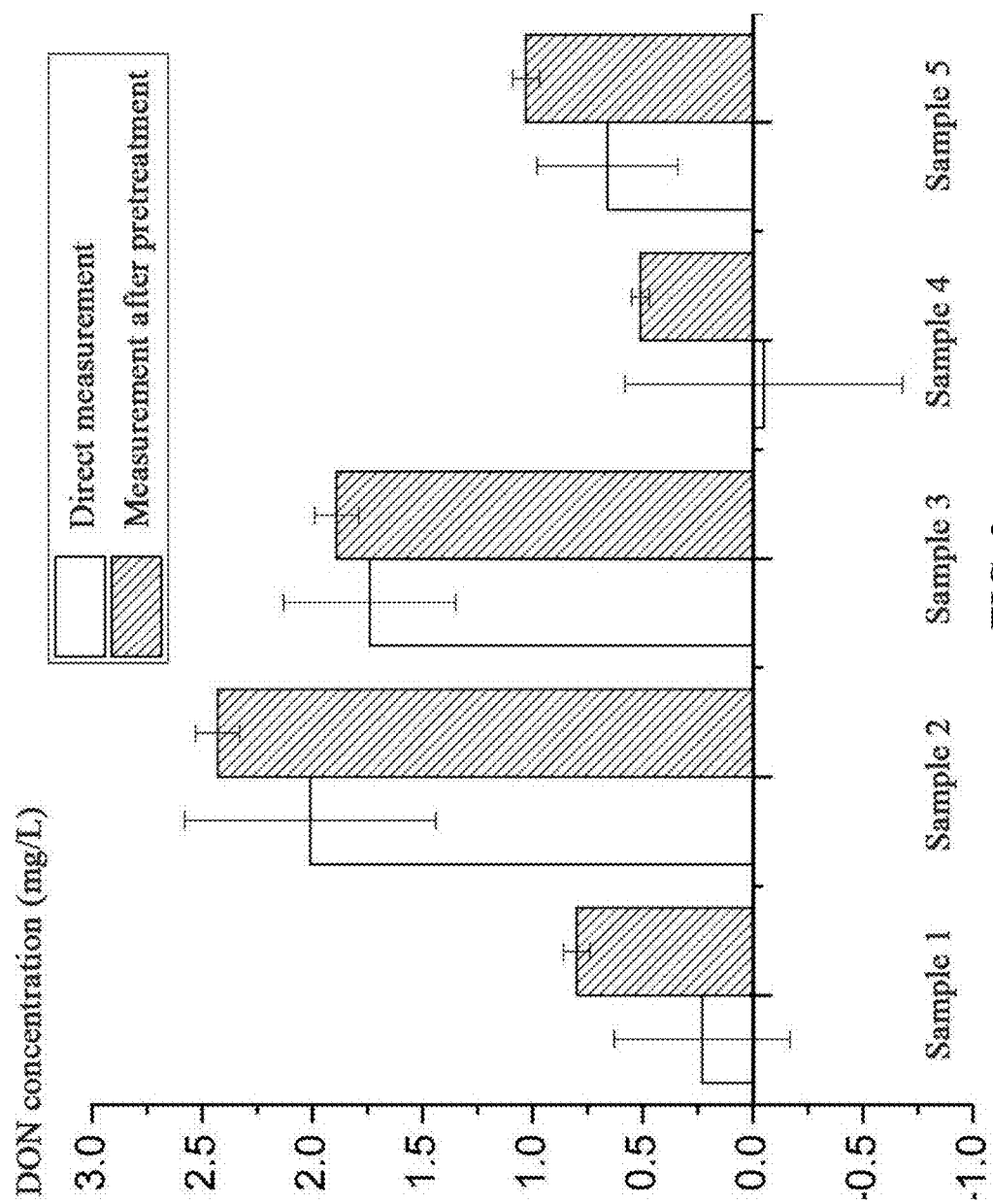
FIG. 2 is a comparison diagram of concentrations of dissolved organic nitrogen measured by conventional methods and the method as described in the disclosure.

4. The concentration of the dissolved organic nitrogen (DON) in the sewage sample was calculated as follows: $DON=C_{TDN(II)}-C_{NH4^+(II)}-C_{NO3^-(II)}-C_{NO2-(II)}$. The DON in the sample 1 was 0.80 mg/L. To ensure the accuracy and reliability of the measurement, the measurement was performed three times and the measured values were averaged. The results are shown in FIG. 2.

Example 2

1. 100 mL of municipal sewage extracted from the anaerobic stage of a wastewater treatment plant (labeled as sample 2) was filtered using a filter membrane having a pore size of 0.45 μm.

2. The concentrations of the total dissolved nitrogen (TDN), $NH_4^+$ and $NO_3^-$ of the sewage were measured using potassium persulfate oxidation-ion chromatography, salicylic acid-hypochlorite spectrophotometry, and ion chromatography, respectively, and were recorded as $C_{TDN(I)}$, $C_{NH4^+(I)}$ and $C_{NO3^-(I)}$;

3. The results showed that $(C_{NH4^+(I)}+C_{NO3^-(I)})/C_{TDN(I)}=0.73>0.7$ and $C_{NO3^-(I)}/C_{NH4^+(I)}<1$. The sewage was dialyzed in a suspended dialysis bag for 34 hours. The suspended dialysis bag was a cellulose ester membrane, hydrophilic, and had a molecular weight cut-off (MWCO) of 100 Da; and the hydraulic retention time of the dialysate in the sewage sample was 4 h. Thereafter, the concentrations of the total dissolved nitrogen (TDN), ammonia nitrogen ($NH_4^+$), nitric nitrogen ($NO_3^-$) and nitrite nitrogen ($NO_2^-$) were measured using potassium persulfate oxidation-ion chromatography, salicylic acid-hypochlorite spectrophotometry, ion chromatography and N-(1-naphthyl)-ethylenediamine spectrophotometry, respectively, and recorded as $C_{TDN(II)}$, $C_{NH4^+(II)}$, $C_{NO3^-(II)}$, and $C_{NO2^-(II)}$, respectively.

4. The concentration of the dissolved organic nitrogen (DON) in the sewage sample was calculated as follows: $DON=C_{TDN(II)}-C_{NH4^+(II)}-C_{NO3^-(II)}$. The DON in the sample 2 was 2.43 mg/L. To ensure the accuracy and reliability of the measurement, the measurement was performed three times and the measured values were averaged. The results are shown in FIG. 2.

Example 3

1. 100 mL of municipal sewage extracted from the aerobic stage of a wastewater treatment plant (labeled as sample 3) was filtered using a filter membrane having a pore size of 0.45 μm.

2. The concentrations of the total dissolved nitrogen (TDN), $NH_4^+$ and $NO_3^-$ of the sewage were measured using potassium persulfate oxidation-ion chromatography, salicylic acid-hypochlorite spectrophotometry, and ion chromatography, respectively, and were recorded as $C_{TDN(I)}$, $C_{NH4^+(I)}$ and $C_{NO3^-(I)}$;

3. The results showed that $(C_{NH4^+(I)}+C_{NO3^-(I)})/C_{TDN(I)}=0.75>0.7$ and $C_{NO3^-(I)}/C_{NH4^+(I)}\geq 1$. The sewage was dialyzed in a suspended dialysis bag for 24 hours. The suspended dialysis bag was a cellulose ester membrane, hydrophilic, and had a molecular weight cut-off (MWCO) of 100 Da; and the hydraulic retention time of the dialysate in the sewage sample was 4 h. Thereafter, the concentrations of the total dissolved nitrogen (TDN), ammonia nitrogen ($NH_4^+$), nitric nitrogen ($NO_3^-$) and nitrite nitrogen ($NO_2^-$) were measured using potassium persulfate oxidation-ion chromatography, salicylic acid-hypochlorite spectrophotometry, ion chromatography and N-(1-naphthyl)-ethylenediamine spectrophotometry, respectively, and recorded as $C_{TDN(II)}$, $C_{NH4^+(II)}$, $C_{NO3^-(II)}$, and $C_{NO2^-(II)}$, respectively.

4. The concentration of the dissolved organic nitrogen (DON) in the sewage sample was calculated as follows: $DON=C_{TDN(II)}-C_{NH4^+(II)}-C_{NO3^-(II)}-C_{NO2-(II)}$. The DON in the sample 3 was 1.89 mg/L. To ensure the accuracy and reliability of the measurement, the measurement was performed three times and the measured values were averaged. The results are shown in FIG. 2.

Example 4

1. 100 mL of treated water extracted from the output of a wastewater treatment plant (labeled as sample 4) was filtered using a filter membrane having a pore size of 0.45 μm.

2. The concentrations of the total dissolved nitrogen (TDN), $NH_4^+$ and $NO_3^-$ of the sewage were measured using potassium persulfate oxidation-ion chromatography, salicylic acid-hypochlorite spectrophotometry, and ion chromatography, respectively, and were recorded as $C_{TDN(I)}$, $C_{NH4^+(I)}$ and $C_{NO3^-(I)}$;

3. The results showed that $(C_{NH4^+(I)}+C_{NO3^-(I)})/C_{TDN(I)}=0.95>0.7$ and $C_{NO3^-(I)}/C_{NH4^+(I)}\geq 1$. The sewage was dialyzed in a suspended dialysis bag for 25 hours. The suspended dialysis bag was a cellulose ester membrane, hydrophilic, and had a molecular weight cut-off (MWCO) of 100 Da; and the hydraulic retention time of the dialysate in the sewage sample was 4 h. Thereafter, the concentrations of the total dissolved nitrogen (TDN), ammonia nitrogen ($NH_4^+$), nitric nitrogen ($NO_3^-$) and nitrite nitrogen ($NO_2^-$) were measured using potassium persulfate oxidation-ion chromatography, salicylic acid-hypochlorite spectrophotometry, ion chromatography and N-(1-naphthyl)-ethylenediamine spectrophotometry, respectively, and recorded as $C_{TDN(II)}$, $C_{NH4^+(II)}$, $C_{NO3^-(II)}$, and $C_{NO2^-(II)}$, respectively.

4. The concentration of the dissolved organic nitrogen (DON) in the sewage sample was calculated as follows: $DON=C_{TDN(II)}-C_{NH4^+(II)}-C_{NO3^-(II)}-C_{NO2-(II)}$. The DON in the sample 4 was 0.51 mg/L. To ensure the accuracy and reliability of the measurement, the measurement was performed three times and the measured values were averaged. The results are shown in FIG. 2.

Example 5

1. 100 mL of 0.99 mg/L standard glutamate solution was mixed with 10 mL of 40.09 mg/L potassium nitrate solution. The mixture (labeled as sample 5) was filtered using a filter membrane having a pore size of 0.45 μm.

2. The concentrations of the total dissolved nitrogen (TDN), $NH_4^+$ and $NO_3^-$ of the mixture were measured using potassium persulfate oxidation-ion chromatography, salicylic acid-hypochlorite spectrophotometry, and ion chromatography, respectively, and were recorded as $C_{TDN(I)}$, $C_{NH4^+(I)}$ and $C_{NO3^-(I)}$;

3. The results showed that $(C_{NH4^+(I)}+C_{NO3^-(I)})/C_{TDN(I)}=0.81>0.7$ and $C_{NO3^-(I)}/C_{NH4^+(I)}>1$. The sewage was dialyzed in a suspended dialysis bag for 24 hours. The suspended dialysis bag was a cellulose ester membrane, hydrophilic, and had a molecular weight cut-off (MWCO) of 100 Da; and the hydraulic retention time of the dialysate in the sewage sample was 4 h. Thereafter, the concentrations of the total dissolved nitrogen (TDN), ammonia nitrogen ($NH_4^+$), nitric nitrogen ($NO_3^-$) and nitrite nitrogen ($NO_2^-$) were measured using potassium persulfate oxidation-ion chromatography, salicylic acid-hypochlorite spectrophotometry, ion chromatography and N-(1-naphthyl)-ethylenediamine spectrophotometry, respectively, and recorded as $C_{TDN(II)}$, $C_{NH4^+(II)}$, $C_{NO3^-(II)}$, and $C_{NO2^-(II)}$, respectively.

4. The concentration of the dissolved organic nitrogen (DON) in the sewage sample was calculated as follows: $DON=C_{TDN(II)}-C_{NH4^+(II)}-C_{NO3^-(II)}-C_{NO2-(II)}$. The DON in the sample 5 was 1.05 mg/L. To ensure the accuracy and reliability of the measurement, the measurement was performed three times and the measured values were averaged. The results are shown in FIG. 2.

As shown in FIG. 2, when the sewage samples 1-4 were not pretreated using the method described in the disclosure, the standard deviation of the measured values was large, and thus the concentration of the DON in the sewage cannot be concluded, or even a negative value was obtained. According to the measurement method as described in the disclosure, the measured value of the DON concentration of the sample 5 was 1.03±0.03 mg/L, and the standard error between the measured value and the truth value (0.99 mg/L)

is 4.04%. The standard error between the DON concentration measured using conventional methods and the truth value in the sample 5 is 33.33%. Therefore, the method of measurement of the concentration of DON is accurate. The standard deviation of the repeated tests is within 10%.

It will be obvious to those skilled in the art that changes and modifications may be made, and therefore, the aim in the appended claims is to cover all such changes and modifications.

What is claimed is:

1. A method of measuring a concentration of dissolved organic nitrogen in sewage, the method comprising:
   (1) extracting a sewage sample from an anaerobic stage or an aerobic stage of a wastewater treatment plant and filtering the sewage sample using a filter membrane to obtain a filtered sewage sample;
   (2) measuring concentrations of total dissolved nitrogen (TDN), ammonia nitrogen ($NH_4^+$), and nitric nitrogen ($NO_3^-$) in the filtered sewage sample, respectively designated as $C_{TDN(I)}$, $C_{NH_4^+(I)}$ and $C_{NO_3^-(I)}$; and
   (3) when $(C_{NH_4^+(I)} + C_{NO_3^-(I)})/C_{TDN(I)} \geq 0.7$ and $C_{NO_3^-(I)}/C_{NH_4^+(I)} < 1$, dialyzing the filtered sewage sample in a suspended dialysis bag for between 34 and 38 hours to obtain a dialyzed sewage sample, and measuring concentrations of total dissolved nitrogen (TDN), ammonia nitrogen ($NH_4^+$), nitric nitrogen ($NO_3^-$) and nitrite nitrogen ($NO_2^-$) in the dialyzed sewage sample, respectively designated as $C_{TDN(III)}$, $C_{NH_4^+(III)}$, $C_{NO_3^-(III)}$, and $C_{NO_2^-(III)}$, and obtaining a concentration of dissolved organic nitrogen (DON) in the sewage sample as follows: $DON = C_{TDN(III)} - C_{NH_4^+(III)} - C_{NO_3^-(III)} - C_{NO_2^-(III)}$;

wherein:
   the suspended dialysis bag is a cellulose ester membrane;
   the suspended dialysis bag is hydrophilic; and
   the suspended dialysis bag has a molecular weight cut-off (MWCO) of 100-500 Da, and a hydraulic retention time of a dialysate in the sewage sample is 4 h.

2. The method of claim 1, wherein the filter membrane has a pore size of 0.45 μm.

3. The method of claim 1, wherein the concentrations of the total dissolved nitrogen (TDN), ammonia nitrogen ($NH_4^+$), nitric nitrogen ($NO_3^-$) and nitrite nitrogen ($NO_2^-$) are measured using potassium persulfate oxidation-ion chromatography, salicylic acid-hypochlorite spectrophotometry, ion chromatography and N-(1-naphthyl)-ethylenediamine spectrophotometry, respectively.

* * * * *